(12) United States Patent
Richards et al.

(10) Patent No.: US 6,289,048 B1
(45) Date of Patent: Sep. 11, 2001

(54) APPARATUS AND METHOD FOR IMPROVING DYNAMIC RANGE IN A RECEIVER

(75) Inventors: Wayne E. Richards; Richard Newell Jekel, both of La Mesa, CA (US)

(73) Assignee: Cubic Communications, Inc., San Diego, CA (US)

( * ) Notice: Subject to any disclaimer, the term of this patent is extended or adjusted under 35 U.S.C. 154(b) by 0 days.

(21) Appl. No.: 09/478,580

(22) Filed: Jan. 6, 2000

(51) Int. Cl.[7] .............................. H03H 7/30; H03H 7/40; H03K 5/159
(52) U.S. Cl. ............................. 375/235; 375/343
(58) Field of Search ..................... 375/235, 329, 375/322, 326, 327, 344, 346, 224, 278, 284, 340, 343; 455/296, 312; 320/304

(56) References Cited

U.S. PATENT DOCUMENTS

| | | |
|---|---|---|
| 4,450,590 | 5/1984 | Lafferty et al. . |
| 5,105,195 * | 4/1992 | Conrad .................................. 342/174 |
| 5,230,099 | 7/1993 | Loper . |
| 5,249,203 | 9/1993 | Loper . |
| 5,339,040 | 8/1994 | Loper . |
| 5,371,902 | 12/1994 | Marz . |
| 5,604,929 | 2/1997 | Loper . |
| 5,613,233 | 3/1997 | Vagher . |
| 6,044,112 * | 3/2000 | Koslov .................................. 375/235 |

* cited by examiner

*Primary Examiner*—Chi Pham
*Assistant Examiner*—Phuong Phu
(74) *Attorney, Agent, or Firm*—Brown Martin Haller & McClain

(57) ABSTRACT

Phase errors and gain errors are reduced in a receiver to increase the dynamic range of the receiver. An input signal is shifted to an intermediate frequency (IF) and divided into a first channel and a second channel. The first and second channels are multiplied by a complex intermediate frequency signal having a frequency equal to the negative of the IF and by the complex conjugate of the intermediate frequency signal to produce a complex normal signal and a complex conjugate signal. A gain correction factor and a phase correction factor are adjusted based on a correlation signal produced by multiplying the complex normal signal by the complex correlation signal.

29 Claims, 4 Drawing Sheets

APPARATUS AND METHOD FOR IMPROVING DYNAMIC RANGE IN A RECEIVER

BACKGROUND OF THE INVENTION

1. Field of the Invention

The present invention relates in general to communication systems and specifically to a method and apparatus for improving the dynamic range of a receiver.

2. Description of the Related Art

Presently, various methods exist for receiving a radio signal. A popular method involves using a superheterodyne receiver. Superheterodyne receivers shift an incoming input signal to at least one intermediate frequency before producing the demodulated output signal. Filtering spurious signals and other unwanted signals can be accomplished more easily at the intermediate frequency (IF) than at baseband or at the carrier frequency at which the radio signal is transmitted. For receivers having a relatively small tuning range relative to the lowest carrier signal that is to be received, the IF is typically lower than the lowest carrier frequency and is chosen to minimize unwanted spurious signals.

Receivers having a wide tuning range (where the highest carrier frequency is many times the lowest carrier frequency) typically shift the incoming signal to an IF that is higher than the highest carrier frequency. The local oscillator (LO) that is used to shift the incoming signal to the IF must, therefore, tune from the IF to almost twice the IF to shift the incoming signal to the IF. The frequency synthesizer used to perform the LO function must be able to tune to high frequencies while maintaining a low phase noise. As a result, receivers using this topology typically exhibit LOs with substantially higher phase noise for carrier frequencies at the lower end of the tuning range of the receiver than other architectures.

One attempt at eliminating the requirement of the LO to produce signals with frequencies higher the carrier frequencies includes the use of a homodyne receiver. Homodyne receivers are also referred to as "zero IF receivers" and "zero-frequency IF receivers" since the tuned channel (incoming signal) is converted directly to baseband (D.C.). In a homodyne receiver, the LO is set to the nominal carrier frequency reducing the need for high frequency LOs. Typically, the LO signal is passed through a quadrature splitter that separates the LO signal into two signals having phases separated by 90 degrees. The input signal is split and mixed with the two LO signals producing a signal with an in-phase component, typically referred to as the "I channel", and a quadrature component typically referred to as the "Q channel". The I and Q channels represent the real part and imaginary part of a complex function of time, respectively. The I and Q channels are further processed to produce the desired output signal.

Homodyne receivers are limited, however, in dynamic range. Non-ideal characteristics of circuits such as the mixers, quadrature splitters and other circuits result in self interference with the homodyne receiver. Currently, in order to achieve a 40 dB signal-to-noise ratio (SNR), the dc offset in the mixers must be less than 1% of the signal amplitude, the error in the quadrature angle must be less than ±1 degree, and the disparity in gain between the I and Q channels must be less than 0.1 dB. Typical homodyne receivers have a practical SNR of 25–30 dB.

Methods have been developed in an attempt to reduce the effects of the non-ideal characteristics of the circuits for applications requiring greater dynamic range. At least one of the methods corrects for circuit errors by observing statistical properties of the input signal and subtracting an appropriate fraction of the Q channel from the I channel to correct for phase errors and scaling the Q channel in order to minimize the amplitude difference between the I and Q channels. These methods are limited, however, in that the DC (direct current) signal produced by the homodyne architecture can not be eliminated unless the modulated signal has a zero mean. The dynamic range, therefore, of the receiver is limited.

Further, these schemes are based on statistical properties of the signal and their correction involves feedback loops with long time constants needed for averaging signals. Therefore, the schemes are further limited in their ability to correct deficiencies quickly. In order to obtain an accurate average, slower circuits must be used.

Therefore, there exists a need for a method and apparatus for reducing phase and gain errors, reducing the DC signal components and providing a receiver with improved dynamic range.

SUMMARY OF THE INVENTION

The present invention relates to a method and apparatus for improving the dynamic range of a receiver by using a low intermediate frequency (IF) and correcting for phase errors and gain mismatches resulting from non-ideal circuit characteristics.

In one embodiment of the invention, undesired spurious signals due to DC signal components that are present in homodyne receivers are reduced by using a low, non-zero, intermediate frequency (IF). Phase errors and gain mismatches between two quadrature channels (I channel and Q channels) are corrected to improve dynamic range of a receiver by adjusting correction factors. One factor determines the amount of one channel that is subtracted from the other channel and the other factor reduces the mismatch in gain between the two channels by scaling one of the channels. The correction factors are determined in accordance with a correlation between two complex signals produced by multiplying the output of a quadrature divider with a complex IF signal and its conjugate.

BRIEF DESCRIPTION OF THE DRAWINGS

For a more complete understanding of the present invention, reference is now made to the following detailed description of the embodiments illustrated in the accompanying drawings, wherein.

DESCRIPTION OF PREFERRED EMBODIMENTS

Figure 1:
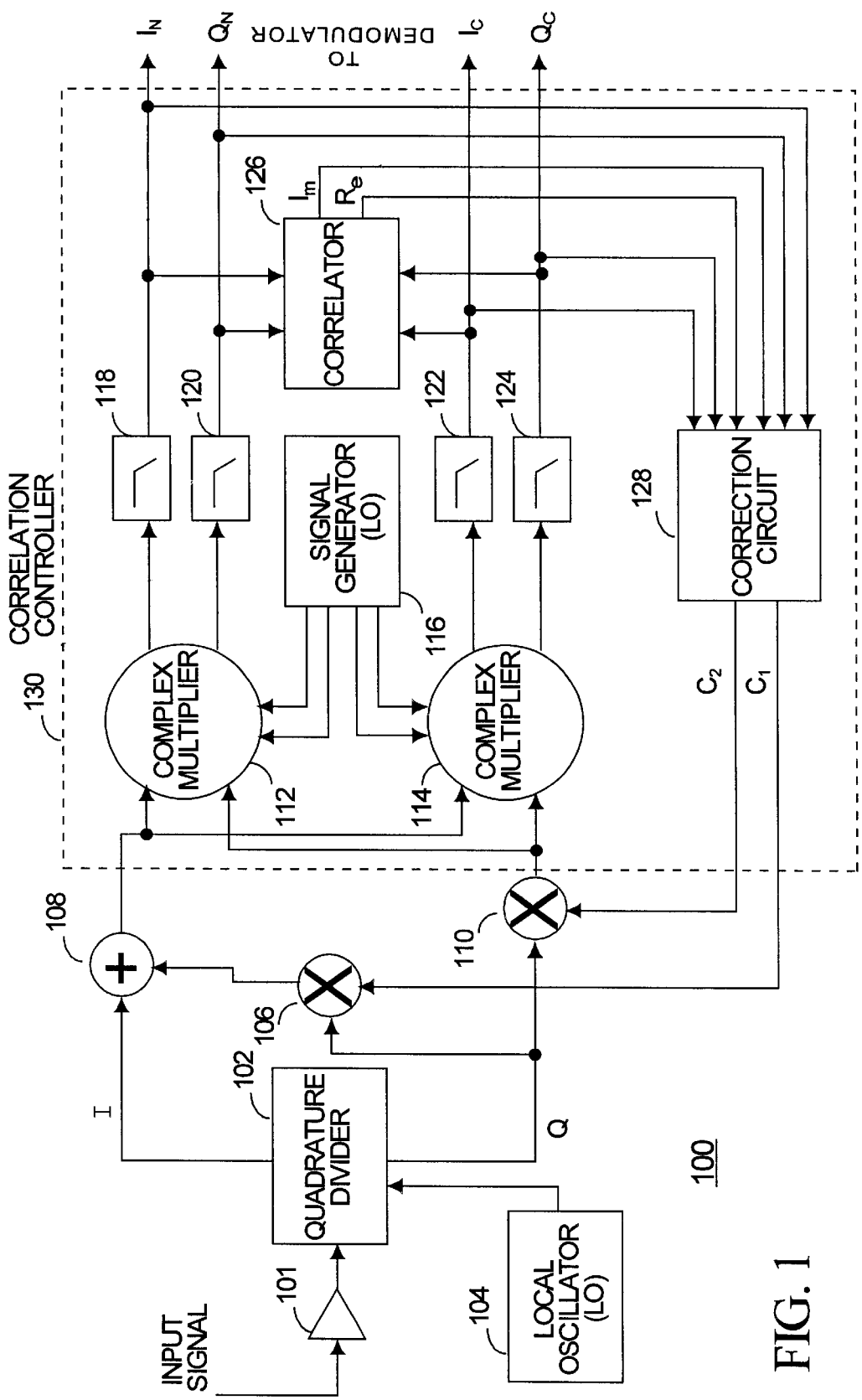
FIG. 1 is a block diagram of a receiver 100 in accordance with a preferred embodiment of the invention.

FIG. 1 is a block diagram of a low IF receiver 100 in accordance with a preferred embodiment of the present invention. Although in the preferred embodiment, the receiver 100 is part of a wireless radio frequency communications system, the present invention may be used in a variety of wireless and wired communication systems such as satellite, cellular telephone, cordless telephone, cable telephony, radar, microwave, infrared, and optical communication systems.

An incoming input signal at a carrier frequency (fc) is received at the receiver 100, preferably, through an antenna. An amplifier 101 amplifies the input signal to maximize the SNR during processing. The input signal is divided into two signals (two channels) and frequency shifted to an intermediate frequency (IF) in the quadrature divider 102. A local oscillator 104 generates an LO signal at the LO frequency that is mixed with the incoming signal to shift the incoming signal to the IF. Therefore, in the preferred embodiment, the quadrature divider 102 is also a frequency shifter (102). However, the input signal may be shifted by a frequency shifter that is implemented separately from the quadrature divider 102 in alternate embodiments.

As will be explained below in regard to FIG. 2, the quadrature divider 102 divides the signal into an in-phase (I) channel and a quadrature (Q) channel. Preferably, the I and Q channels have a phase difference of 90 degrees. The Q channel is scaled by a phase correction factor, C1, by multiplying the Q channel by C1 in a phase correction multiplier 106 to produce a scaled version of the Q channel. This correction signal (scaled version of the Q channel) is added to the I channel to produce a corrected I channel in a combiner 108. The Q channel is also multiplied by a gain correction factor, C2, in a gain correction multiplier 110 to produce a corrected Q channel.

As will be discussed below, the phase correction factor, C1, is chosen to minimize the phase errors while the gain correction factor, C2, is chosen to compensate for gain differences between the I and Q channel. As is known, phase errors can be modeled as a portion of the Q channel leaking into the I channel. By subtracting the appropriate amount of the Q channel from the I channel, phase errors can be minimized. The errors due to differences in the gains experienced by each of the I and Q channels is minimized by reducing or increasing the amplitude of the Q channel using the gain correction factor. In the preferred embodiment, the combiner 108 is a signal adder (108) and, therefore, the phase correction factor has the appropriate polarity to result in a subtraction of the appropriate proportion of the Q channel.

The corrected I channel and the corrected Q channel form a complex corrected signal. A correlation controller 130 determines the values of the phase correction factor and the gain correction factor by correlating the corrected I and Q channels. The correlation controller 130 adjusts the phase and gain correction factors to minimize the correlation between the corrected I channel and the corrected Q channel.

The complex corrected signal is injected into a pair of complex multipliers (112, 114). The complex corrected signal is multiplied by a complex intermediate frequency signal in a complex multiplier 112 to produce a normal complex signal. The complex intermediate frequency signal (also referred to as a negative IF signal) is a complex signal having a frequency equal to the negative of the IF. The complex corrected signal is also multiplied by the complex conjugate of the complex intermediate frequency signal in a second complex multiplier 114 to produce a complex conjugate signal. The complex intermediate frequency signal and the complex conjugate of the complex intermediate frequency signal are produced by a signal generator 116 as discussed below.

An I channel ($I_N$) and a Q channel ($Q_N$) of the normal complex signal are filtered by filter 118 and filter 120 respectively. An I channel ($I_C$) and a Q channel ($Q_C$) of the complex conjugate channel are low pass filtered by filter 122 and filter 124 respectively. The filters 118–124 are designed to pass the desired baseband signal while rejecting, at least, undesired mixing products such as multiples of the IF signal. Preferably, the filters 118–124 are chosen to have identical characteristics.

The complex normal signal and the complex conjugate signal are correlated in a complex correlator 126. The correlation signal produced by the complex correlator 126 is used by a correction circuit 128 to determine the phase and gain correction factors that are used in the multipliers 106, 110. As will be discussed in detail below, the correction circuit 128 uses the complex conjugate signal and the complex normal signal to calculate the correction factors in the preferred embodiment.

Therefore, by mixing the intermediate frequency signal and its conjugate with the I and Q channels, a correlation signal is produced. Phase and gain errors are corrected by adjusting the phase correction factor and the gain correction factor based on the correlation signal. Self interference due to DC components, as experienced in homodyne receivers, are eliminated by using an intermediate frequency other than zero. Although in the preferred embodiment, the dynamic range of the receiver 100 is improved by adjusting both the phase correction factor and the gain correction factor, in alternate embodiments, only one of the factors is adjusted.

Figure 2:
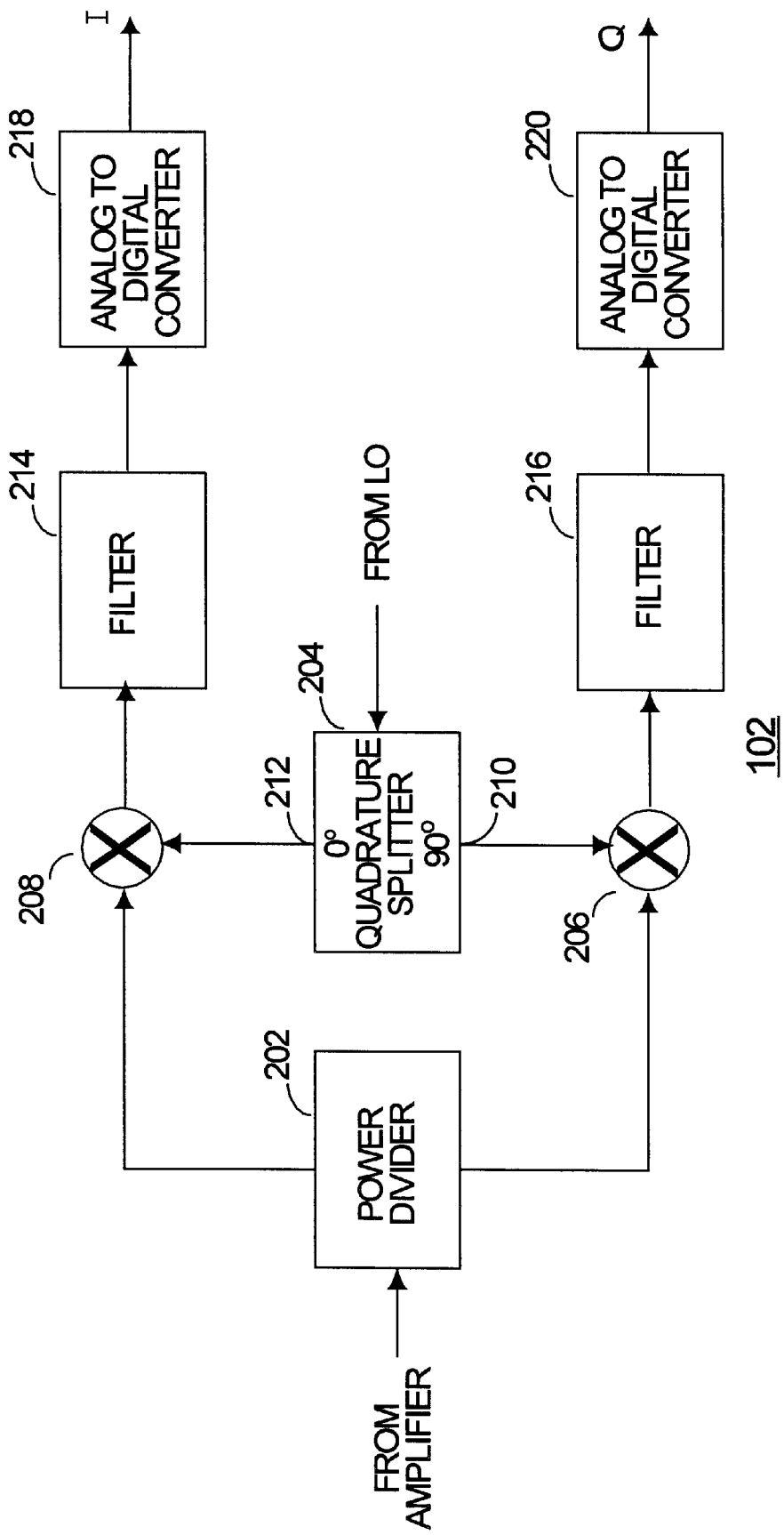
FIG. 2 is a detailed block diagram of the quadrature divider 102 in accordance with the preferred embodiment of the invention.

FIG. 2 is a block diagram of the quadrature divider 102 in accordance with the present invention. The amplified input signal is received a the power divider 202 where the signal is divided in two signals, each having approximately half the power of the amplified input signal. The signals are mixed with the output of a quadrature splitter 204 in mixers 206, 208. The quadrature splitter 204 (also referred to as a hybrid power divider) divides the LO signal produced in the LO 104 into two signals. A quadrature output 210 of the quadrature splitter 204 provides a phase shift of approximately 90 degrees from an in-phase output 212. In addition to producing a signal having a frequency equal to the difference of the input signal frequency (carrier frequency) and the LO, each of the mixers 206, 208 also produces an undesired signal having a frequency equal to the sum of the two frequencies.

A filter 214 coupled to the output of the mixer 208 reduces the undesired mixing products produced by the mixer 208 including the signal having a frequency equal to the sum of the LO frequency and the carrier frequency. Another filter 216 filters the output produced by the other mixer 206 to reduce undesired mixing products. The two filters 214, 216, preferably, have identical characteristics and should be chosen such that each tracks the other in amplitude and phase over the IF frequency band. Although the receiver 100 compensates for phase and gain differentials between the two channels, the receiver 100 should be designed to minimize variations in the differentials over the IF frequency bandwidth. As those skilled in the art will recognize, the tolerances required for the filters 214, 216 can be relaxed by choosing an analog to digital conversion rate many times higher than the chosen low IF frequency.

In the preferred embodiment, processing of the I and Q channels is performed using digital signal processing (DSP). Analog techniques may be used, however, in alternate embodiments of the invention. Analog to digital (AD) converters 218, 220 convert the output of each of the filters 214, 216 to a digital signal. The filters 214, 216 are preferably matched and also serve as anti-aliasing filters for the analog to digital converters 218, 220. In other words each of the filters 214, 216, in addition to reducing unwanted mixing products, band limits each of the outputs from the mixers 206, 208 to reduce aliasing within the analog to digital converters 218, 220.

Therefore, the output of the analog to digital converter 218 is a digital representation of the I channel at the intermediate frequency and the output of the other analog to digital converter 220 is a digital representation of the Q channel at the intermediate frequency.

Figure 3:
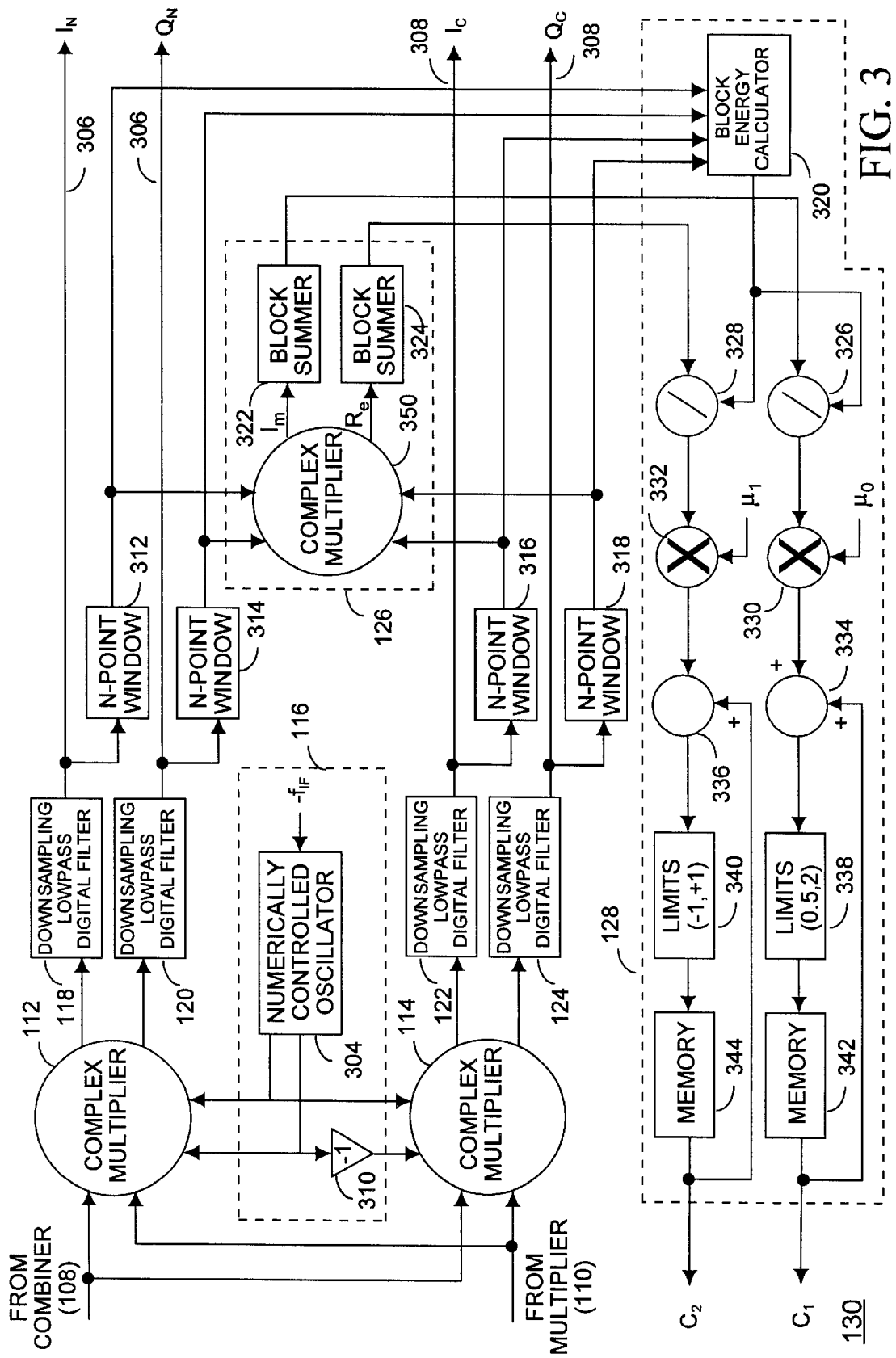
FIG. 3 is a detailed block diagram of the correlation controller 130 in accordance with the preferred embodiment of the invention.

FIG. 3 is a detailed block diagram of the correlation controller 130 in accordance with the preferred embodiment of the invention. As explained above in reference to FIG. 1, the corrected complex signal formed by the corrected I channel and the corrected Q channel is received by the correction controller 130 through a pair of complex multipliers 112, 114.

The corrected I channel and the corrected Q channel include both positive and negative frequency components. The signals with the positive frequencies include the desired signal at the intermediate frequency and the signals having a negative frequency include the image of the desired intermediate frequency signal. The complex multiplier 112 down converts the desired signal at the intermediate frequency to baseband by multiplying the complex corrected signal by the complex intermediate frequency signal generated in the frequency generator 116. Since the frequency of the complex intermediate signal is equal the negative of the intermediate frequency, the desired signal is translated down in frequency by the intermediate frequency to produce the complex normal signal in the normal channel 306

The complex corrected signal is multiplied by the complex conjugate of the complex intermediate frequency signal in the complex multiplier 114 to produce the complex conjugate signal. In the preferred embodiment, the frequency generator includes a numerically controlled oscillator 304 set to operate at the negative of the intermediate frequency. The frequency generator 116 also includes a complementary circuit 310 for generating a numerical complement of the imaginary component of the complex intermediate frequency signal. Therefore, in the preferred embodiment, the frequency generator 116 generates the complex conjugate of the intermediate frequency signal by taking the numerical complement of the imaginary component of the signal generated by the NCO 304. The desired signal is translated up in frequency to produce the complex conjugate channel in the conjugate channel 308 by multiplying the complex conjugate of the intermediate frequency signal by the complex corrected signal in the complex multiplier 114.

As described above, the filters 118–124 reduce the undesired mixing products produced in the complex multipliers 112,114. Preferably the filters 118–124 are digital filters identical in form and performance to each other.

In the preferred embodiment, the output of the digital filters 118–214 are "windowed" in windowing blocks 312–318. The windowing blocks 322, 324 average the data over a finite period ("block") of time to reduce noise or sinusoids while retaining any DC component. Any sinusoidal signal will average to zero if the block length is an integer multiple of the sinusoidal period. Any other length, however, will not necessarily average to zero. A "windowing" process includes multiplying each element of a finite sequence ("window") by a corresponding element of the signal sequence (the block to be averaged). If the window is defined properly the result of windowing a sinusoidal signal is a value near zero independent of the number of cycles.

A sinusoidal signal may appear in the block to be averaged when there are two sinusoidal signals at the RF input to the receiver where one signal is within the desired frequency bandwidth and the other is within the image frequency bandwidth. The windowing process is used to prevent the signals from combining to produce a non-zero block average which would result in the receiver 100 falsely attempting to correct for the non-zero signal. The windowing process, therefore, reduces the undesired effects of the combination of a sinusoidal signal present in the desired bandwidth with a signal in the image frequency bandwidth. A single signal in either the desired or image frequency bandwidth drives the receiver to improve image rejection and the windowing process does not affect such signals.

The complex normal channel and the complex conjugate channel are multiplied in complex correlator 126. In the preferred embodiment, the complex correlator 126 is comprised of a complex multiplier 350 and block summers 322, 324, as shown in FIG. 3, which sum its real and imaginary outputs over the block length, N. The complex correlation produced by the correlator 126 has an imaginary component and a real component. The imaginary component of the correlation signal is directly proportional to the phase (quadrature) error of the complex corrected signal injected into the correlation controller 130. The real component of the correlation signal is directly proportional to the gain mismatch between the I channel and the Q channel of the complex corrected signal. Therefore, by observing the correlation signal, the appropriate gain correction factor and phase correction factor can be determined by the correction circuit 128.

The block energy calculator 320 determines the total energy of the correlation signal by summing the squares of the samples within each windowed block to produce a total block energy. The total block energy is used to normalize the correlation signal as discussed below.

The imaginary block sum is normalized by dividing it by the total block energy in a divider 326 and the real block sum is normalized by dividing it by the total block energy in a second divider 328. Each block sum is normalized to assure stable and uniform convergence over a wide range of input signal amplitudes. In the preferred embodiment, the correction adjustment procedure can be characterized as a Least Mean Square (LMS) filter. The normalization process assures that the feedback gain is great enough for a quick loop response on weak signals, yet small enough for loop stability in the presence of strong signals. Since there is no assurance as to which of the two channels is greater, the energy from the complex normal channel 306 is added to the complex conjugate channel 308. This assures a smooth transition between a situation where a signal dominates in the complex normal channel 306 and a situation where the signal dominates in the complex conjugate channel 308.

As explained above, the feedback is based on a desired signal in the desired frequency bandwidth or on an undesired signal which falls in the image frequency bandwidth. When no signal is present, the noise in the two frequency bandwidths provides the information necessary to drive the correction loops in the right direction. As indicated above, the normalization process maintains the loop gain within useful limits. In particular, the normalization process prevents the feedback gain from getting too high and thereby making the loop unstable. Since, at this point in the receiver 100, any signal in either the desired frequency bandwidth or the image frequency bandwidth is capable of driving the correction loops, the larger of the two signals tends to dominate the process. This effect is desired since, when the correction loops are functioning, any signal in the desired frequency bandwidth appears in the complex normal channel 306, and any signal in the image frequency bandwidth appears in the complex conjugate channel 308. The energy is combined from these two channels in order that the normalization process will be dominated by the largest signal and the feedback gain will never exceed a value that maintains stability.

The normalized imaginary block sum is multiplied by a constant $\mu_0$ to control the rate of convergence and subtracted (or added depending in the sign of $\mu_0$) from C1 in an adder 330 in order to provide an improved value of C1. Therefore, in the preferred embodiment, the phase correction factor is frequently, i.e., once for each length N block of data in the preferred embodiment, adjusted to reduce the correlation between the complex normal channel 306 and the complex conjugate channel 308. The phase correction factor, C1, is limited in a limiter 338 to facilitate recovery after unusual signal conditions. Preferably, C1 is restricted to the range $-1 \leq C1 \leq +1$ by the limiter 340. C1 is stored in a memory register 342.

The normalized real block sum produced by the divider 328 is multiplied by a constant, $\mu_1$, in a multiplier 332 and added to the previous value of C2 in an adder 336 in order to provide an improved value of the gain correction factor. Preferably, the gain correction factor is frequently, i.e., once for each length N block of data in the preferred embodiment, adjusted to reduce the mismatch between the complex normal channel 306 and the complex conjugate channel 308. To facilitate recovery after unusual signal conditions, C2 is limited in a limiter 340 to the range $0.5 \leq C1 < 2$. C2 is stored in a second memory register 344.

Figure 4:
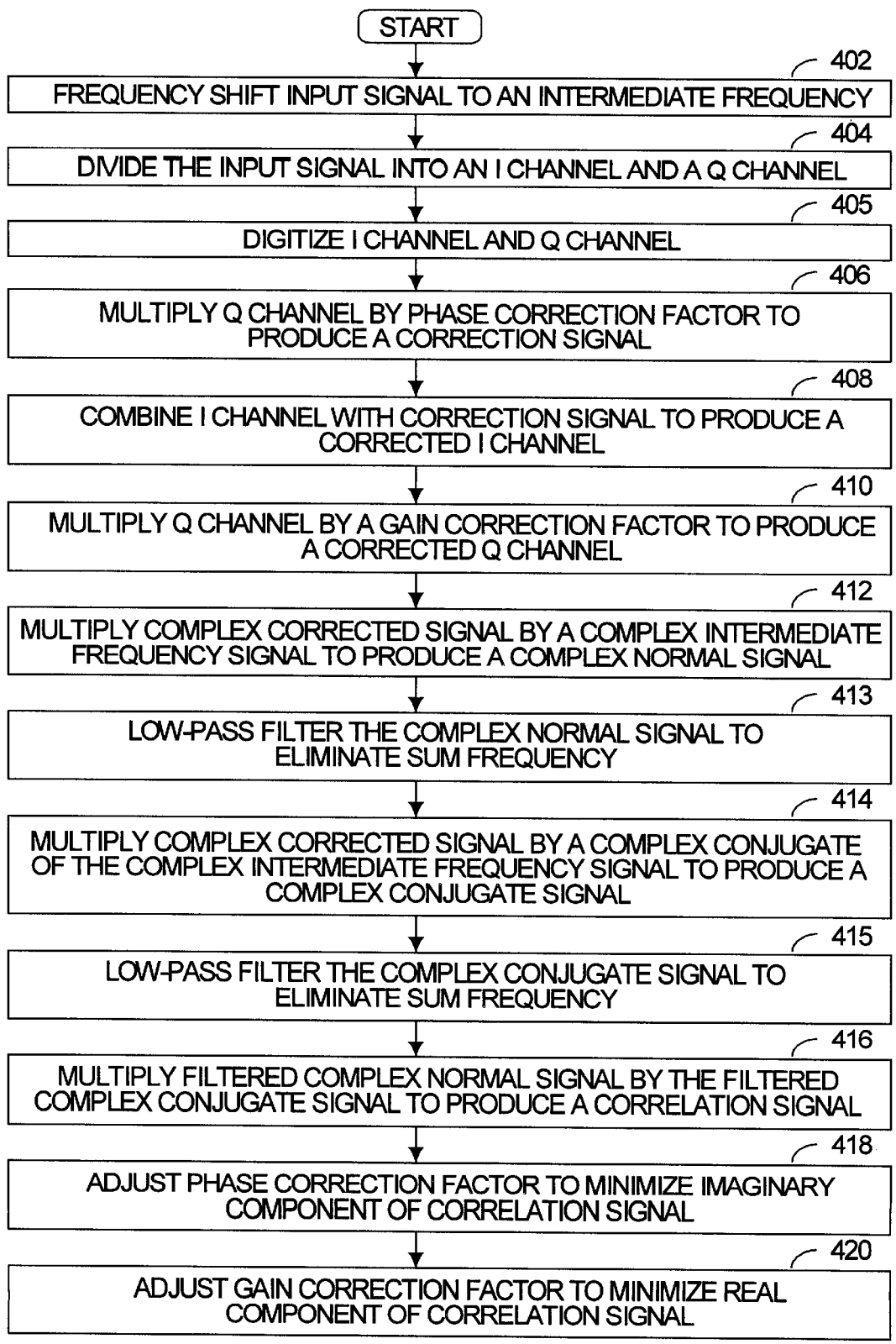
FIG. 4 is a flow chart of a method in accordance with the preferred embodiment of the invention.

FIG. 4 is a flow chart of a method in accordance with the preferred embodiment of the invention. At step 402, the incoming input signal is frequency shifted to the intermediate frequency.

At step 404, the input signal is divided into two channels: an in-phase channel (I channel) and a quadrature channel (Q channel). Preferably, the Q channel is approximately 90 degrees out of phase withe the I channel. As discussed above, in the preferred embodiment, the signal is frequency shifted and quadrature divided in the quadrature divider 102. Although steps 402 and 404 are illustrated as separate blocks, in the preferred embodiment these steps occur simultaneously. In other words the incoming input signal is frequency shifted and divided into an in-phase component and a quadrature component at the same time.

The I channel and the Q channel are converted to digital signals at step 405. As discussed above, the analog to digital converter 218 converts the I channel into a digital signal and the analog to digital converter 220 converts the Q channel to a digital signal.

At step 406, the Q channel is multiplied by the phase correction factor to produce a correction signal (scaled version of the Q channel).

The correction signal is added to the I channel to produce a corrected I channel at step 408. As discussed above, the appropriate portion of the Q channel is subtracted from the I channel to produce the corrected I channel. Therefore, the polarity of the phase correction factor is chosen accordingly.

At step 410, the Q channel is multiplied by a gain correction factor to produce a corrected Q channel. The corrected I channel and the corrected Q channel form a complex corrected signal.

At step 412, the complex corrected signal is multiplied by the complex intermediate frequency signal to produce a complex normal signal. As explained above, the complex intermediate frequency signal is a complex signal having a frequency equal to the negative of the intermediate frequency. Preferably the complex intermediate frequency signal is generated in the numerically controlled oscillator (NCO) 304.

At step 413, the complex normal signal is low-pass filtered to eliminate the sum frequency components.

At step 414, the complex corrected signal is multiplied by the complex conjugate of the complex intermediate frequency signal to produce a complex conjugate signal. Preferably the complex conjugate of the intermediate frequency signal is generated by taking the numerical complement of the imaginary component of the complex intermediate frequency signal produced by the NCO 304.

At step 415, the complex conjugate signal is low-pass filtered to eliminate the sum frequency components. Preferably, the filters of step 413 and step 415 are identical in design and performance.

The filtered complex normal signal and the filtered complex conjugate signal are multiplied to produce a correlation signal at step 416.

At step 418, the phase correction factor is adjusted to minimize the imaginary component of the correlation signal. As discussed above, in the preferred embodiment, the correction circuit 128 determines the phase correction factor based on the imaginary component of the correlation signal produced by the complex multiplier 126 and the total block energy.

At step 420, the gain correction factor is adjusted to minimize the real component of the correlation signal. Preferably, the correction circuit 128 determines the gain correction factor based on the real component of the correlation signal produced by the complex multiplier 126 and the total block energy.

Therefore, in the preferred embodiment, the dynamic range of the receiver 100 is improved by shifting the input signal to an intermediate frequency, dividing the signal into an I channel and a Q channel, and adjusting the phase correction factor and the gain correction factor to reduce the correlation between the I and Q channels. The I and Q channels are correlated by multiplying the complex corrected channel (I and Q channels) by the complex intermediate frequency signal and its complex conjugate. The resulting correlation signal is observed to determine the phase correction factor and the gain correction factors Other embodiments and modifications of the present invention will occur readily to those of ordinary skill in the art in view of these teachings.

Such persons will appreciate the symmetries among the various embodiments illustrated above and understand that their elements may be arranged in other ways to produce similar results. For example, the input signal may be shifted using digital techniques and may be accomplished in a separate device from the quadrature divider without departing from the scope of the invention. Similarly, signals and their complements may be inverted from the designations in the illustrated embodiments without departing from the scope of the invention. Also, some portions of the digital signal processing steps of the preferred embodiment may be accomplished with dedicated logic circuitry, while other portions may be implemented by software in a programmable digital signal processor (DSP), depending on the bandwidth requirement at each stage. Therefore, this inven-

What is claimed is:

1. A method of receiving a signal comprising the steps of:
    shifting an incoming signal to an intermediate frequency;
    dividing the signal into a complex signal having positive frequency components and negative frequency components, the complex signal comprising a first channel and a second channel;
    adjusting a phase of the first channel by subtracting a scaled version of the second channel from the first channel, the scaled version derived from a correlation between the positive frequency components and the negative frequency components, and
    adjusting an amplitude of the second channel by a gain correction factor to minimize a gain mismatch between the first channel and the second channel, the gain correction factor based on the correlation between the positive frequency components and the negative frequency components.

2. A method in accordance with claim 1 further comprising the steps of:
    determining the correlation between the positive frequency components and the negative frequency components, the step of determining the correlation comprising the steps of:
        multiplying the complex signal by a complex intermediate frequency signal having a frequency equal to a negative of a nominal intermediate frequency to produce a normal complex signal;
        multiplying the complex signal by a complex conjugate of the complex intermediate frequency signal to produce a conjugate complex signal; and
        determining a correlation between the complex normal signal and the complex conjugate signal.

3. A method in accordance with claim 2 further comprising the step of generating the gain correction factor and a phase correction factor based on the correlation between the complex normal signal and the complex conjugate signal, and
    multiplying the phase correction factor by the second channel to obtain the scaled version of the second channel.

4. A method of receiving a signal comprising the steps of:
    frequency shifting the signal to an intermediate frequency;
    dividing the signal into a first channel and a second channel;
    multiplying the second channel by a phase correction factor to produce a correction signal;
    multiplying the second channel by a gain correction factor to produce a corrected second channel;
    combining the first channel with the correction signal to produce a corrected first channel, the corrected second channel and the corrected first channel forming a complex corrected signal;
    multiplying the complex corrected signal by a complex intermediate frequency signal having a frequency equal to a negative of the intermediate frequency to produce a complex normal signal;
    multiplying the complex corrected signal by a complex conjugate of the complex intermediate frequency signal to produce a complex conjugate signal;
    adjusting the phase correction factor to minimize imaginary components of a correlation between the complex normal signal and the complex conjugate signal, and
    adjusting the gain correction factor to minimize real components of the correlation between the complex normal signal and the complex conjugate signal.

5. A method in accordance with claim 4 wherein the second channel is a quadrature channel of the first channel.

6. A method in accordance with claim 5 wherein a phase difference between the first channel and the second channel is approximately 90 degrees.

7. A method in accordance with claim 6 further comprising the step of measuring the correlation between the first channel and the second channel by observing a complex correlation signal produced by multiplying the complex normal signal by the complex conjugate signal.

8. A method in accordance with claim 7 further comprising the steps of filtering the complex normal signal and the complex conjugate signal to reduce spurious mixing products.

9. A method in accordance with claim 7 further comprising the step of determining the phase correction factor based on an imaginary component of the correlation signal.

10. A method in accordance with claim 7 further comprising the step of determining the gain correction factor based on a real component of the correlation signal.

11. A method of receiving a signal comprising the steps of:
    frequency shifting the signal to an intermediate frequency;
    dividing the signal into an in-phase channel (I channel) and a quadrature channel (Q channel);
    multiplying the Q channel by a gain correction factor to produce a corrected Q channel;
    combining the I channel with a phase corrected signal to produce a corrected I channel, the corrected Q channel and the corrected I channel forming a complex corrected signal having positive and negative frequency components;
    multiplying the complex corrected signal by a complex intermediate frequency signal having a frequency equal to a negative of the intermediate frequency to produce a complex normal signal;
    multiplying the complex corrected signal by a complex conjugate of the complex intermediate frequency signal to produce a complex conjugate signal; and
    adjusting the gain correction factor to minimize a correlation between the complex normal signal and the complex conjugate signal.

12. A method in accordance with claim 11 further comprising the steps of:
    multiplying the Q channel signal by a phase correction factor to obtain the phase corrected signal; and
    adjusting the phase correction factor to minimize the correlation between the complex normal signal and the complex conjugate signal.

13. A method in accordance with claim 12 further comprising the step of measuring the correlation between the positive and negative frequency components by observing a complex correlation signal produced by multiplying the complex normal signal by the complex conjugate signal.

14. A method in accordance with claim 13 further comprising the steps of filtering the complex normal signal and the complex conjugate signal to reduce spurious mixing products.

15. A method in accordance with claim 12 further comprising the step of determining the phase correction factor based on an imaginary component of the correlation signal.

16. A method in accordance with claim 12 further comprising the step of determining the gain correction factor based on a real component of the correlation signal.

17. A method of receiving a signal comprising the steps of:
frequency shifting the signal to an intermediate frequency;
dividing the signal into an in-phase channel (I channel) and a quadrature channel (Q channel);
multiplying the Q channel by a phase correction factor to produce a correction signal;
combining the I channel with the correction signal to produce a corrected I channel;
multiplying the Q channel by a gain correction factor to produce a corrected Q channel, the corrected Q channel and the corrected I channel forming a complex corrected signal;
multiplying the complex corrected signal by a complex intermediate frequency signal having a frequency equal to a negative of the intermediate frequency to produce a complex normal signal;
multiplying the complex corrected signal by a complex conjugate of the complex intermediate frequency signal to produce a complex conjugate signal;
multiplying the complex normal signal by the complex conjugate signal to produce a complex correlation signal;
adjusting the phase correction factor to minimize an imaginary component of the complex correlation signal; and
adjusting the gain correction factor to minimize a real component of the complex correlation signal.

18. A method in accordance with claim 17, wherein the step of adjusting the phase correction factor comprises the step of adjusting the phase correction factor based on previous values of the phase correction factor.

19. A method in accordance with claim 17, wherein the step of adjusting the gain correction factor comprises the step of adjusting the gain correction factor based on previous values of the gain correction factor.

20. A receiver comprising:
a frequency shifter adapted to shift a signal to an intermediate frequency;
a signal divider adapted to divide the signal into a first channel and a second channel;
a signal combiner adapted to combine a scaled version of the second channel to the first channel to produce a corrected first channel;
a correlation controller adapted to determine a gain correction factor for adjusting the second channel, and a phase correction factor for producing the scaled version of the second channel, the correlation controller comprising:
a first complex multiplier adapted to produce a complex normal signal by multiplying the corrected first channel and the adjusted second channel by a complex intermediate frequency signal having a frequency equal to a negative of the intermediate frequency;
a second complex multiplier adapted to produce a complex conjugate signal by multiplying the corrected first channel and the adjusted second channel by a complex conjugate of the complex intermediate frequency signal; and
a correlator adapted to correlate the complex normal signal and the complex conjugate signal to produce a correlation signal having a real component and an imaginary component, wherein the phase correction factor is based on the imaginary component of the correlation signal, and wherein the gain correction factor is based on the real component of the correlation signal.

21. A receiver according to claim 20, further comprising a gain multiplier adapted to multiply the second channel by the gain correction factor received from the correlation controller to produce the adjusted second channel.

22. A receiver according to claim 20, further comprising a phase correction multiplier adapted to multiply the second channel by the phase correction factor to produce the scaled version of the second channel.

23. A receiver according to claim 20 further comprising a signal generator adapted to produce the complex intermediate frequency signal and the complex conjugate of the complex intermediate frequency signal.

24. A receiver according to claim 20 wherein the correlator is a third complex multiplier adapted to multiply the complex normal signal with the complex conjugate signal.

25. A receiver according to claim 24 further comprising:
a first pair of low pass filters coupled between the first complex multiplier and the third complex multiplier; and
a second pair of low pass filters coupled between the second complex multiplier and the third complex multiplier.

26. A receiver comprising:
a quadrature divider adapted to divide an input signal into an in-phase (I) channel at an intermediate frequency and a quadrature (Q) channel at the intermediate frequency;
a phase correction multiplier adapted to scale the Q channel to produce a scaled version of the Q channel by multiplying the Q channel by a phase correction factor;
a signal combiner adapted to combine the scaled version of the Q channel to the I channel to produce a corrected I channel;
a gain correction multiplier adapted to scale the Q channel to produce a corrected Q channel by multiplying the Q channel by a gain correction factor, the corrected I channel and the corrected Q channel forming a corrected complex channel;
a first complex multiplier adapted to produce a complex normal signal by multiplying the corrected complex channel by a complex intermediate frequency signal having a frequency equal to a negative of the intermediate frequency;
a second complex multiplier adapted to produce a complex conjugate signal by multiplying the corrected complex channel by a complex conjugate of the complex intermediate frequency signal;
a third complex multiplier adapted to correlate the complex normal signal and the complex conjugate signal to produce a correlation signal by multiplying the complex normal signal by the complex conjugate signal; and
a correction circuit coupled to the third complex multiplier, the correction circuit adapted to producing the phase correction factor and the gain correction factor based on the correlation signal.

27. A receiver in accordance with claim 26 wherein the correction circuit adapted to produce the phase correction factor based on an imaginary component of the correlation signal.

28. A receiver in accordance with claim 26 wherein the correction circuit is adapted to produce the gain correction factor based on a real component of the correction signal.

29. A correction controller for determining a phase correction factor and a gain correction factor for correcting phase and gain errors between an in-phase (I) channel and a quadrature (Q) channel of an input signal, the correction controller comprising:
- a pair of complex multipliers adapted to multiply the I channel and the Q channel by an intermediate frequency and a conjugate of the intermediate frequency signal to produce a complex normal signal and a complex conjugate signal;
- a correlator coupled to the pair of complex multipliers and adapted to produce a correlation signal based on a correlation between the complex normal signal and the complex conjugate signal; and
- a correction circuit adapted to produce the phase correction factor and the gain correction factor based on the correction signal.

* * * * *